United States Patent [19]

Oddenino

[11] 4,328,949
[45] May 11, 1982

[54] COCK FOR CONTROLLING THE HEATING SYSTEM OF A MOTOR VEHICLE

[75] Inventor: Maurico Oddenino, Turin, Italy

[73] Assignee: ITW Fastex Italia S.p.A., Turin, Italy

[21] Appl. No.: 230,836

[22] Filed: Feb. 2, 1981

[30] Foreign Application Priority Data

Feb. 8, 1980 [IT] Italy .............................. 20743/80[U]

[51] Int. Cl.³ .............................................. F16K 1/20
[52] U.S. Cl. ................................... 251/165; 251/175; 251/188; 251/301
[58] Field of Search ............... 251/301, 302, 312, 165, 251/175, 188

[56] References Cited

U.S. PATENT DOCUMENTS

| | | | |
|---|---|---|---|
| 950,204 | 2/1910 | Drown | 251/301 |
| 1,882,600 | 10/1932 | Hollinshead et al. | 251/301 |
| 3,157,382 | 11/1964 | Perry | 251/312 |
| 4,161,307 | 7/1979 | Clinch et al. | 251/301 |

FOREIGN PATENT DOCUMENTS

| | | | |
|---|---|---|---|
| 2553229 | 9/1977 | Fed. Rep. of Germany | 251/301 |
| 703545 | 5/1931 | France | 251/301 |
| 1334739 | 7/1963 | France | 251/301 |
| 188290 | 11/1922 | United Kingdom | 251/301 |

*Primary Examiner*—H. Jay Spiegel
*Attorney, Agent, or Firm*—Thomas W. Buckman; J. R. Halvorsen

[57] ABSTRACT

A cock for controlling the heating system of a motor vehicle has a flat valve member controlled by a lever. Under operating conditions said valve member is permanently biased by the pressure of the heating liquid against a sealing ring provided in the seat of the valve member in the cock housing and the control lever is connected to the pin of said valve member by means of a screw, the screw serving as a secondary means for biasing the valve member.

1 Claim, 1 Drawing Figure

COCK FOR CONTROLLING THE HEATING SYSTEM OF A MOTOR VEHICLE

BACKGROUND AND OBJECTS OF INVENTION

The present invention refers to cocks for controlling the heating system of a motor vehicle.

These cocks comprise generally a flat valve member controlled by a lever and adapted to be brought in various positions starting from a position in which it fully cuts off the communication between a pipe section upstream the cock and a pipe section downstream the cock until a position in which it leaves the communication between the two pipe sections completely free. The sealing between the valve member and its seat in the housing of the cock is generally assured by a spring urging the valve member against its seat with the interposition of the flange of a guide sleeve for the spring.

It is the object of the present invention to simplify the sealing system of the valve member.

It has been ascertained that the pressure exerted on the valve member by the liquid flowing in the upstream pipe is per se sufficient to keep the valve member biased against its seat. Under these conditions in order to assure sealing, it is sufficient that the seat of the valve member be provided with a sealing ring and the control lever of the valve member be secured to the valve member by means of a screw, which screw also serves as a secondary means for insuring sealing of the valve against the seat sealing ring.

More particularly the cock according to the invention is of the type with a substantially flat valve member controlled by a lever and is characterized in that under operating conditions said valve member is permanently biased by the pressure of the heating liquid againt a sealing ring provided in the seat of the valve member in the cock housing, and in that the control lever is connected to the pin of said valve member by means of an adjusting screw.

The invention will be better understood from the following description of a cock according to the invention shown in axial cross-section in FIG. 1, the single FIGURE of the accompanying drawing.

DETAILED DESCRIPTION

Figure 1:
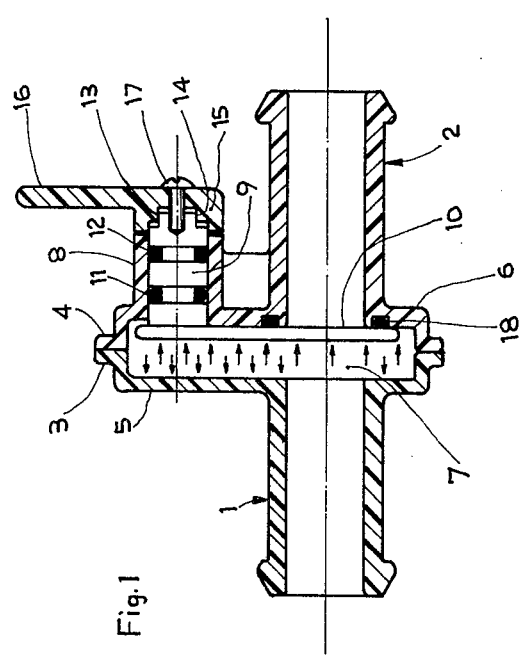

From an inspection of said FIGURE is seen that a pipe fitting (1) and a pipe fitting (2) are co-axially joined to each other, in a manner not shown, at the respective flanges (3) and (4) provided at the periphery of the respective half shells (5) and (6) each forming an enlargement of the respective fitting and forming therebetween a chamber (7). Projecting integrally from the half shell (6) is a sleeve (8) in which a pin (9) is complimentary received, with said pin non-rotatably connected at one end to a flat valve member (10). This pin (9) includes two axially spaced annular grooves or seats for accepting respective sealing rings (11), (12) and has at the free end thereof two opposite flat faces (13), (14) intended to match corresponding flat faces provided in the cup shaped portion (15) of a control lever (16) which is secured to the end of the pin (9) by means of a screw (17).

Arranged in an appropriate seat provided in the half shell (6) on the side of the aperture of the fitting (2) facing the chamber (7) is a sealing ring (18).

It will be noted that the axial length of pin (9), as measured from its connection with valve member (10) to its opposite free end, is equal to or slightly less than the combined axial lengths of the co-axial bores in sleeve (8) and the interior of cup shaped portion (15).

On securing the lever (16) to the pin (9) by means of the screw (17) it is necessary to tighten the screw to draw the pin (9) to the right, as viewed in the drawing, so as to assure the engagement between the valve member (10) and the sealing ring (18) as well as to bring the opposed free ends of cup shaped portion (15) and sleeve (8) into abutting relation.

When the heating system is in operation, assuming that the valve member is in a position closing the mouthpiece of the fitting (2), the pressure of the heating liquid in the direction of the arrow F, keeps the valve member (10) biased against the sealing member (18). Due to the pressures involved in the heating systems of motor vehicles, the force due to the liquid pressure alone is generally sufficient to keep the valve member (10) biased in sealing condition against the sealing ring (18). However, the action of screw (17) to draw the pin (9) and valve (10) into predetermined position also insures a sealing condition of valve (10) relative to sealing ring (18). It is thus seen that in the described cock the usual spring with the attendant guide sleeve has been spared which was used in the prior art cocks of this type. The instant cock and its components can be injection molded of suitable plastic materials and flanges (3) and (4) assembled by known methods. The screw is preferably metallic, to permit, if desired, to form its own threads in a bore opening into the free end of pin (9). Pin (9) and valve member (10) can be fabricated as a one piece item or alternatively joined as independent parts in a fixed non-rotatable manner.

I claim:

1. A cock for controlling the heating system of a motor vehicle of the type including a housing having a chamber, upstream and downstream pipe fittings each communicating with port means in said chamber walls, said pipe fittings being disposed in co-axial spaced opposition, seat means in said chamber interior wall surrounding said downstream port means, and a flat valve member controlled by a lever and adapted to be moved laterally into and out of covering engagement with said seat means, said housing including an integral through bored sleeve positioned laterally of said port means, said sleeve having a predetermined length with its interior communicating with said chamber at one end and ambient at the other end, integral pin means connected to said valve member at one end and extending into said sleeve, said pin having means at its opposite end for accepting an adjustment screw associated with said lever, said lever including a cup shaped portion at one end having a polygonal shaped bore of a predetermined depth and said cup shaped portion including a free edge, said pin including at its free end opposite its connection to said valve a complementary shaped polygonal end acceptable in said polygonal shaped bore, said pin having a length from said valve to its free end less than the combined length of said predetermined length sleeve and said predetermined depth polygonal bore, whereby when the free edge of said cup shaped portion bears on the ambient end of said bore sleeve said adjustable screw can be inserted through the cup shaped portion into the screw accepting means of said pin and pull the valve member into biased relation with said seat means, whereby under operating conditions said valve member is permanently biased by multiple means in the form of upstream pressure acting in said chamber on said flat valve member and said adjustable screw means capable of biasing said valve member against a sealing ring provided in the seat means.

* * * * *